United States Patent [19]

Gautier

[11] B 3,915,461
[45] Oct. 28, 1975

[54] SEAL AND GROOVE SET FOR DISC BRAKE ACTUATOR

[75] Inventor: Jean-Pierre Gautier, Saint-Denis, France

[73] Assignee: Societe Anonyme D.B.A., Paris, France

[22] Filed: Apr. 13, 1973

[21] Appl. No.: 350,843

[44] Published under the Trial Voluntary Protest Program on January 28, 1975 as document no. B 350,843.

[30] Foreign Application Priority Data

Apr. 25, 1972 France .............................. 72.14593

[52] U.S. Cl. .................... 277/170; 92/168; 277/171
[51] Int. Cl.² ............................................ F16K 9/00
[58] Field of Search ........... 277/171, 173, 177, 170; 92/168, 249

[56] References Cited
UNITED STATES PATENTS

| | | | |
|---|---|---|---|
| 1,726,380 | 8/1929 | Blomgren | 277/171 |
| 2,019,757 | 11/1935 | Loweke | 277/171 |
| 2,798,779 | 7/1957 | Swartz et al. | 277/173 |
| 3,218,051 | 11/1965 | Doetsch | 277/177 |
| 3,377,076 | 4/1968 | Burnett | 277/171 |

Primary Examiner—Harry N. Haroian
Assistant Examiner—John W. Shepperd
Attorney, Agent, or Firm—Ken C. Decker; William N. Antonis

[57] ABSTRACT

A seal and groove set for a disc brake actuator comprising an annular seal with a substantially square cross-section and a groove formed in a cylindrical surface having an axis of revolution, the seal being housed in the groove and the groove having in axial section a first flank perpendicular to the said axis and a second, oblique flank diverging out of the groove relative to the perpendicular flank, each flank being connected to the cylindrical surface by a chamfer, the bottom of the groove comprises a ridge resulting from the intersection of a first and a second frustoconical surface of revolution.

4 Claims, 3 Drawing Figures

SEAL AND GROOVE SET FOR DISC BRAKE ACTUATOR

The invention relates to a seal and groove set for an actuator cylinder for disc brakes installed in motor vehicles.

More particularly, the invention relates to a seal and groove set of the type comprising an annular seal with a substantially square cross-section and a groove formed in a cylindrical surface having an axis of revolution, the seal being housed in the groove and the groove having in axial section a first flank perpendicular to the said axis and a second, oblique flank diverging out of the groove relative to the perpendicular flank. Seal and groove sets of this type are used especially in the cylinders of disc brake actuators, such as disclosed in U.S. Pat. No. 3,377,076, to ensure that the actuator piston returns and does not recoil, while at the same time fulfilling their customary sealing function. After the brake pressure has been applied, the seal must return the actuator piston within very precise limits, both to prevent permanent contact between the friction pad and disc and to avoid an excessively long idle stroke when pressure is next applied. In addition the actuator piston, which is subject to vibrations having various causes and is affected by disc wobble, particularly while the vehicle is cornering, tends to move deeper into the cylinder, so considerably lengthening the idle stroke, and this can be prevented if the seal and groove set has an anti-recoil effect.

To ensure these return and anti-recoil effects, the invention proposes a seal and groove set of the type described, characterised in that the bottom of the groove comprises an annular ridge projecting radially toward said axis of revolution.

According to a preferred embodiment of the invention, the ridge results from the intersection of a first and a second frustoconical surfaces of revolution.

Still according to the preferred embodiment of the invention, the perpendicular flank and the oblique flank are connected to the first and second frustoconical surfaces respectively along a first and a second equal circle respectively, the frustoconical surfaces being connected along a third circle whose diameter is greater than the diameters of the equal circles and whose plane is situated between the two planes of the equal circles; also, the plane of the third is nearer the plane of the second circle than the plane of the first circle.

When in the idle position, therefore, if the brake disc is on the same side as the oblique flank, a groove embodying the invention provides the seal with a preferred position beside the perpendicular flank, corresponding to the piston's idle position, which is therefore set very precisely. Furthermore, when the piston shifts it forces the seal to leave its preferred position and to tilt on to the oblique flank, thereby increasing the adhesion of the seal to the piston, due to the acute angle existing between surface CD and piston wall.

The invention will be better understood from the ensuing description referring to the accompanying drawings, in which.

Figure 1:
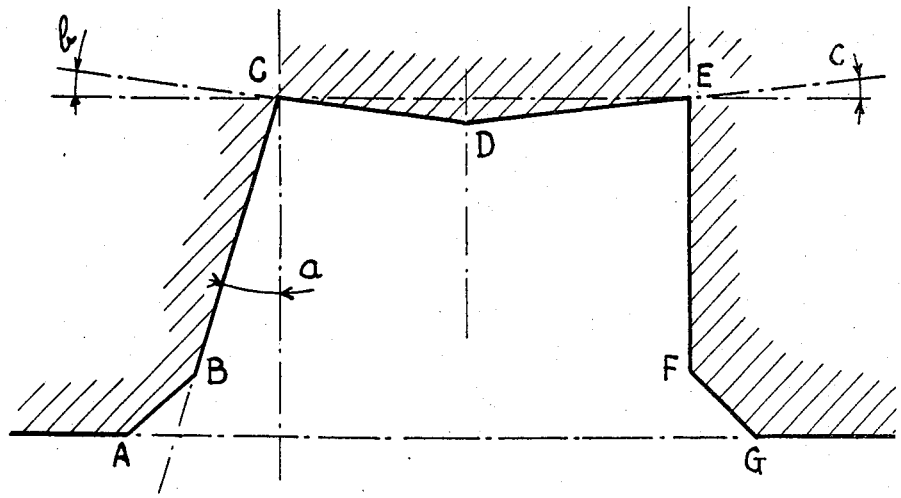
FIG. 1 illustrates an axial section through a groove embodying the invention.

FIG. 1 is a section through a groove formed in a surface AG having an axis of revolution (not shown). This surface may, for example, be the inside surface of an actuator cylinder for a disc brake, or the outside surface of the piston of such an actuator. For clarity's sake, it will be assumed for the purpose of this description that the surface AG is that of a disc brake actuator cylinder, the associated disc being situated beyond the point A relating to the point G.

The groove shown in FIG. 1 has a flank EF perpendicular to the axis of the surface AG, and a flank BC which is oblique relative to the flank EF and which diverges out of the groove relative to the perpendicular flank EF. The angle a formed by the flank BC with the flank EF may, for example, be between 10° and 20°.

The flank BC is connected to the surface of the cylinder by a chamfer AB and the flank EF by a chamfer FG.

In accordance with the invention, the bottom of the groove is provided with an annular ridge D resulting from the intersection of two cones, a first surface ED connected to the perpendicular flank EF at E and a second surface CD connected to the oblique flank BC at C. The circles C and E advantageously have equal diameters.

The surfaces CD and DE intersect at a circle D, such that the diameter of this circle is smaller than that of the circles C and E, or in other words, the circle D projects from the bottom of the groove.

The half-angle at the vertex $b$ of the frustoconical surface CD may be between 6° and 8°, whereas the half-angle at the vertex $c$ of the frustoconical surface DE may be between 4°30′ and 6°30′.

In addition, the angle b may be greater than the angle c, or in other words the plane of the circle D may be closer to the plane of the circle C than to the plane of the circle E, for example in the ratio 3:4.

Figure 2:
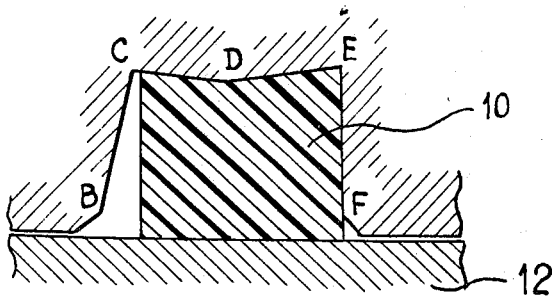
FIG. 2 illustrates a seal and groove set embodying the invention, in an idle position.
Figure 3:
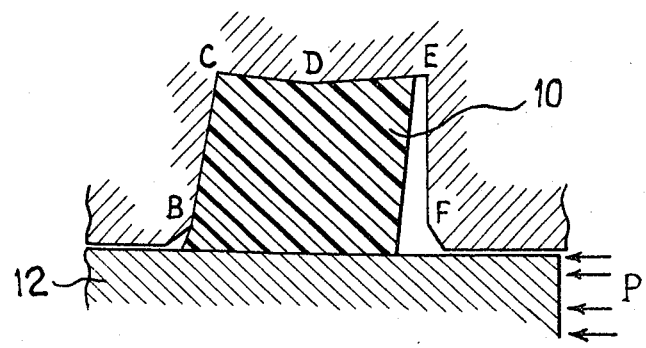
FIG. 3 illustrates the set shown in FIG. 2 in an operative position, a pressure P being applied.

FIGS. 2 and 3 illustrate operation of the groove shown in FIG. 1.

FIG. 2 shows a seal 10, of square cross-section before installation, clamped in the groove shown in FIG. 1 by a piston 12 capable of sliding in the cylinder from which the groove is machined.

In FIG. 2, the seal and groove set is in an idle position, that is, the piston 12 is not subjected to any axial stress, whereas in FIG. 3, which shows the same components as FIG. 2, the piston 12 and seal 10 are subjected to a force towards the left (in FIG. 3) due to a fluid pressure P.

As FIGS. 2 and 3 show, when the pressure P is zero the seal 10 takes up its preferred position due to the asymmetry of the groove bottom, and bears on the flank EF of the groove. When the pressure P is applied, the piston 12 moves to the left in the figures, and the seal 10 is also urged to the left, due to friction on the piston 12 and thrust due to the pressure p. While it moves the seal 10 is compressed in the constriction formed by the projecting ridge D, and its adhesion to the piston 12 is therefore increased. At the end of its movement the seal 10 abuts on the oblique flank BC, and the piston 12 may continue its stroke, impermeability being ensured by the wedging effect to which the seal is subjected between the piston 12 and flank BC.

When the pressure P is relaxed the seal 10, then in an unstable equilibrium position, returns to the preferred, stable position shown in FIG. 2, and in so doing entrains the piston 12 a distance which is consequently well-defined, so ensuring a precise and constant clearance between the brake disc and the friction pad moved by the piston 12.

Lastly, the anti-recoil effect is ensured because the movement of the piston 12 to the right in FIG. 2 when the pressure P is zero is impeded due to the seal 10 being clamped on to the piston 12 by the constriction formed by the groove bottom.

What we claim is:

1. In a disc brake having a housing defining a cylinder therewithin having a cylindrical surface, a circumferentially extending groove in said cylindrical surface; a seal having a substantially square cross section disposed in said groove, said groove having a first flank extending substantially perpendicular to the axis of said cylinder and a second flank extending obliquely to said axis of the cylinder, and a bottom flank interconnecting the first and second flanks having an annular ridge projecting radially inwardly toward the axis of said cylinder, said ridge being defined by the intersection of a first cone with a second cone, said first and second flanks intersecting said first and second cones respectively, the intersection of the first flank with the first cone defining a first circle, the intersection between the second cone and the second flank defining a second circle, the intersection of said cones at said ridge defining a third circle in a plane between the plane of the first and second circles, the plane of the third being nearer to the plane of the second circle than to the plane of the first circle.

2. The invention of claim 1, wherein the diameters of the first and second circles are equal.

3. The invention of claim 1, wherein the diameter of the third circle is less than the diameter of the first and second circles.

4. The invention of claim 1, wherein each of said first and second flanks is connected to the cylindrical surface by a chamfer.

* * * * *